US 6,572,270 B2

(12) United States Patent
Takemura et al.

(10) Patent No.: US 6,572,270 B2
(45) Date of Patent: Jun. 3, 2003

(54) ROLLING BEARING UNIT

(75) Inventors: Hiromichi Takemura, Kanagawa (JP); Yasuo Murakami, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/910,069

(22) Filed: Jul. 23, 2001

(65) Prior Publication Data
US 2002/0028033 A1 Mar. 7, 2002

(30) Foreign Application Priority Data
Jul. 21, 2000 (JP) ........................... 2000-219962

(51) Int. Cl.⁷ ............................ F16C 33/62; F16H 55/44
(52) U.S. Cl. ......................... 384/476; 474/170; 474/199
(58) Field of Search ................... 474/170, 199; 384/476

(56) References Cited

U.S. PATENT DOCUMENTS 3,924,906 A * 12/1975 Kitaoka ................... 308/1 R
4,886,377 A    12/1989 Adachi et al.
5,387,172 A     2/1995 Habenicht et al.
5,507,698 A *  4/1996 Kuribayashi .............. 474/170
6,220,982 B1 * 4/2001 Kawashima et al. ........ 474/199

FOREIGN PATENT DOCUMENTS

| JP | 3-189340 | 8/1991 |
| JP | 3-189450 | 8/1991 |
| JP | 4-160225 | 6/1992 |
| JP | 9-177910 | 7/1997 |

* cited by examiner

Primary Examiner—Christopher P. Schwartz
(74) Attorney, Agent, or Firm—Sughrue Mion, PLLC

(57) ABSTRACT

An insulative resin coating film 9 of the range of 10 to 40 $\mu$m thick is formed, by electrodeposition coating, on the outer surface of a pulley 2 inclusive of an outer surface 2E of the iron pulley 2 which is in sliding contact with a belt 3 and an inner surface 2I fit to a rotary shaft 4. With formation of the insulative resin coating film, an electrical resistance after 10 hours of the unit running is 1 M$\Omega$ or larger. A static electricity caused by a friction between the pulley 2 and the belt 3 is −1 kV or lower. As a result, a potential difference between the rolling element and the race ring (outer ring or inner ring) is 1 V or lower.

14 Claims, 1 Drawing Sheet

ROLLING BEARING UNIT

BACKGROUND OF THE INVENTION

1. Field of the Invention

The present invention relates to a rolling bearing unit having a metallic pulley for slidably supporting a belt on an outer surface thereof, and a rolling bearing for rotatably supporting the pulley. More particularly, the rolling bearing unit of the invention preferably has a metallic pulley with an outer surface which has a belt power transmission surface formed thereon.

2. Description of the Related Art

Driven pulleys are mounted on the engine auxiliary equipment of a motor vehicle, such as an alternator, an electromagnetic clutch and a compressor. A rotation of a crankshaft is transmitted to the auxiliary equipment by drive pulleys and belts. Generally, the driven pulley is formed of an iron, which has a high strength and is easy to be machined, such as S45C, a cold rolling steel plate, or SPCC. Recently, a resin pulley made of glass-fiber reinforced phenolic resin is also used for the driven pulley for the purpose of weight reduction. In the light of pulley form, the V-ribbed pulley with V-grooves formed in the outer surface is mainly used. The pulley made of a metallic material is usually coated with an anti-corrosive or wear-resisting paint.

Another pulley is proposed and disclosed in Japanese Patent Unexamined Publication No. Hei 3-189340. In the proposed pulley, a surface of a portion at which the pulley is rotatably mounted is subjected to hard plating coating, and a V-groove surface of the pulley is subjected to soft electrodeposition coating. Therefore, it is possible to prevent formation of fletching caused when the paint comes off by a friction between the belt and the pulley, and generation of a squeal by the belt.

However, where the general iron pulley is used near the engine as described above, a static electricity of about 10 kV is generated by a friction between the belt and the pulley, which are driven by the crankshaft rotating at higher speed. Part of the static electricity generated discharges to the air. Another part of the static electricity also discharges to the rolling bearing in contact with the pulley as disclosed in Japanese Patent Unexamined Publication No. Hei. 4-160225, and thus it accelerates an electrolysis reaction of the water contained in the grease to generate hydrogen ions. The hydrogen ions are attracted to the raceway surface, and enter the inside of the raceway surface in the form of hydrogen ions. This will bring about early exfoliation of the race ring.

Where the pulley entirely formed of resin is used, the weight reduction is advantageously secured. The resin per se is usually an electrically insulating material. Accordingly, it is easy to be charged through its friction against the belt. Foreign materials, e.g., dust, are easy to attach to a belt sliding contact surface of the pulley which is in sliding contact with the belt. The belt sliding contact surface is likely to be worn abnormally through the abrasive action there. Temperature excessively rises on the belt sliding contact surface, so that the surface is abnormally deformed. As a result, the belt power transmission is abnormal or the lifetime of the pulley per is reduced.

The technique disclosed in Japanese Patent Unexamined Publication No. Hei. 3-189450 is such that at least the surface of the pulley which is mounted on a rotatable body is hard chrome plated, and the V-groove portion of the pulley, viz., the belt sliding contact surface, is subjected to electrodeposition coating. In this type of the pulley, part of static electricity generated will flows into the inside of the bearing via the plated part. As a result, discharge is performed between the rolling element and the raceway surface. In this case, if a potential difference between the rolling element and the race ring (inner ring or outer ring) is in excessive of 1V, hydrogen will be generated as in the above case.

SUMMARY OF THE INVENTION

The present invention has been directed to solve the problems stated above. It is an object to provide a rolling bearing unit which suppresses an amount of static electricity generated through the friction between the pulley and the belt, and puts a potential difference produced in the rolling bearing to be 1 V or lower by forming a strong insulating layer over a range from the pulley to the bearing, whereby generation of hydrogen ions is suppressed and the lifetime of the unit is elongated.

The above-mentioned object can be achieved by a rolling bearing unit, according to the present invention, having a metallic pulley for slidably supporting a belt on an outer surface thereof, and a rolling bearing for rotatably supporting the pulley, wherein an insulative resin coating film with a thickness of the range of 10 to 40 $\mu$m is formed on the outer surface and/or an inner surface of the pulley, and an electrical resistance value of a path ranging from the belt sliding contact surface of the pulley to the inner surface or the outer surface of the rolling bearing is 1 M$\Omega$ or larger. The insulative resin coating film is formed by electrodeposition coating with an insulative resin.

The term "electrodeposition coating" is a called cation electrodeposition coating. In the coating process, a member to be coated is immersed in a water paint, and then the member immersed is set as a cathode, while the paint is as an anode. A DC voltage is applied to between the member and the paint, whereby a coating film is formed over the member. In the coating process, paint enters narrow gaps of the coated member when the coating process specifications are controlled so. A coating film of the range of 10 to 40 $\mu$m thick is uniformly formed over the all surface. When the coated member is pulled up from the coating solution, the coating film formed thereon is unsoluble in water and has a low water content.

DETAILED DESCRIPTION OF THE INVENTION

Figure 1:
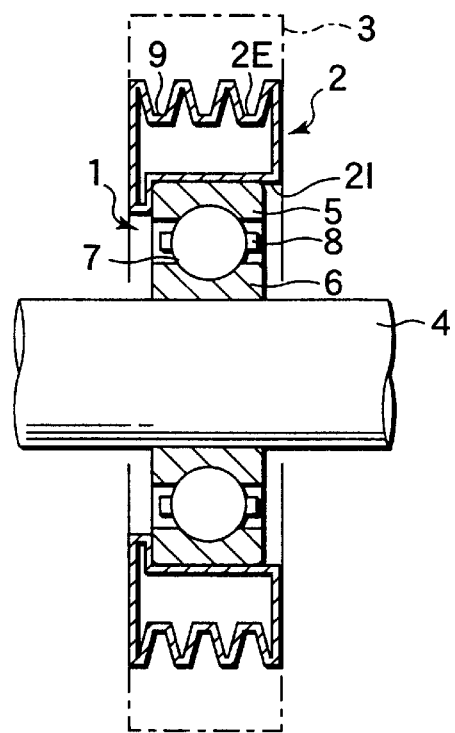
FIG. 1 is a longitudinal sectional view showing a rolling bearing unit according to an embodiment of the present invention.

The preferred embodiment of the present invention will be described with reference to the accompanying drawings. FIG. 1 is a cross sectional view showing a rolling bearing unit according to an embodiment of the present invention. A rolling bearing 1 used by the rolling bearing unit is a ball bearing (inside diameter=12 mm, outside diameter=37 mm, and width=12 mm) manufactured according to JIS 6301. The rolling bearing is formed with an outer ring 5, an inner ring 6, rolling elements 7 and a holder 8. In the embodiment, the outer ring 5 rotates with respect to a rotary shaft 4, which is inserted into the inner ring 6 of the rolling bearing 1.

The outer ring 5 of the rolling bearing 1 is covered with an iron pulley 2. A plurality of V-grooves for supporting a belt 3 are formed in an outer surface 2E of the iron pulley 2. An outer surface of the iron pulley 2 inclusive of the outer surface 2E of the iron pulley 2 which slidably supports the belt 3 and an inner surface 2I fit to the rolling bearing 1 are entirely subjected to electrodeposition coating to form an insulative coating film 9 with a thickness of the range of 10 to 40 μm thereon. In the embodiment, although the insulative coating film 9 is formed on both of the outer surface 2E and the inner surface 2I, the insulative coating film 9 maybe formed on either the outer surface 2E or the inner surface 2I of the pulley. Examples 1 to 4 and comparisons 1 to 5 were formed by changing a kind of the insulative coating film 9 formed by the electrodeposition coating and varying its thickness. Rolling bearing units in which the insulative coating film is not formed, and the outer surfaces of the pulleys are plated with hard chromium or zinc are included in those comparisons. All the pulleys are made of a material of S45C. In examples 1 to 4 and comparisons 2 and 3, the outer surface of the pulley is subjected to electrodeposition coating with an insulative resin, i.e., amino-alkyd resin, epoxy resin, acrylic resin, or vinyl chloride resin.

The life test of those rolling bearing units was conducted. Test equipment described in Japanese Patent Unexamined Publication No. Hei. 9-177910 was used for the life test. The test was conducted according to the bench acceleration/deceleration test in which the number of revolution is changed between 5000 rpm and 1000 rpm at a predetermined time interval (e.g., 9 seconds). The belt used was a 4-ridge ribbed belt (manufactured by Bando corporation). The load condition of the bearing under test was: P (load)/C (rated dynamic load)=0.10, and the sealing grease was the Egrease. The lifetime calculated of the bearing was 2200 hours, and then the test ending time was set at 4000 hours. The number (N) of tests for each sample (the example and comparison) was 10; N=10.

A static electricity (charged voltage) was also measured in the test. Exactly, a static electricity measuring instrument (FMX-002, manufactured by Simco corporation; ion balance measurement) was placed at the exit of the belt as viewed in the rotational direction of the test pulley of the test equipment. A peak value of a static electricity caused by the friction between the rotating pulley and the belt was measured. In each test, electrical resistance between the outside diameter of the pulley and the outer ring of the bearing was measured by use of a tester after 100 hours test is stopped. A maximum resistance value was obtained through the measurement. When a value of the resistance is small, the pulley and the outer ring of the bearing are electrically continuous to each other. When the resistance value is large, those are electrically insulated from each other.

The test results are shown in Table 1A and 1B.

TABLE 1A

| | pulley material | pulley surface treatment | coating thickness (μm) |
|---|---|---|---|
| Example 1 | S45C | electrodeposition coating, amino-alkyd resin | 40 |
| Example 2 | S45C | electrodeposition coating, epoxy resin | 15 |

TABLE 1A-continued

| | pulley material | pulley surface treatment | coating thickness (μm) |
|---|---|---|---|
| Example 3 | S45C | electrodeposition coating, acrylic resin | 20 |
| Example 4 | S45C | electrodeposition coating, vinyl chloride resin | 10 |
| Comparison 1 | S45C | none | — |
| Comparison 2 | S45C | electrodeposition coating, acrylic resin | 5 |
| Comparison 3 | S45C | electrodeposition coating, vinyl chloride resin | 50 |
| Comparison 4 | S45C | Hard chrome plating | 20 |
| Comparison 5 | S45C | zinc plating | 30 |

TABLE 1B

| | Static electricity (charged voltage) (V) | electrical resistance after 100 hrs(Ω) | $L_{10}$ lifetime (hr) | Exfoliation |
|---|---|---|---|---|
| Example 1 | −0.3 k | 70M | 4000 | Non |
| Example 2 | −0.5 k | 10M | 4000 | Non |
| Example 3 | −0.1 k | 35M | 4000 | Non |
| Example 4 | −1.0 k | 1M | 3500 | Exfoliating of 3/10 inner ring |
| Comparison 1 | −3.8 k | 5 | 295 | Exfoliating of 10/10 inner ring |
| Comparison 2 | −0.9 k | 10 | 1035 | Exfoliating of 10/10 inner ring; peeling off of coating |
| Comparison 3 | −1.0 k | — | 57 | creeping of 10/10 outer ring |
| Comparison 4 | −2.3 k | 7 | 315 | exfoliating of 10/10 inner ring |
| Comparison 5 | −5.5 k | 9 | 115 | exfoliating of 10/10 inner ring |

As seen from Table 1, in the rolling bearing unit of the pulley subjected to the electrodeposition coating of each of the embodiments 1 to 3, no exfoliation of the inner ring was found even after 4000 hours ("hr" in the figure). At this time, a static electricity (charged voltage) caused by a friction between the pulley and the belt was −0.5 kV or lower. Further, an electrical resistance of a path ranging from the outer surface of the pulley to the outer ring of the bearing after the testing of 100 hours was 10 MΩ or lager. As a result, a potential difference between the bearing race ring (inner ring or outer ring) and the rolling element, caused by generation of a static electricity is put below 0.5 V. Thus there is no chance that water contained in the grease is electrolyzed to generate hydrogen. The reason why the inner ring is not exfoliated may be so estimated.

In the example 4, although 3 of 10 samples suffered from inner ring exfoliation, the lifetime of $L_{10}$ was 3500 hours, about ten times as long as 295 hours of the comparison 1. The reason for this may be estimated in the following. A thickness of the insulative coating film of the pulley is 10 μm, thinner than that of each of other examples.

Accordingly, a static electricity (charged voltage) is −1.0 kV. The electrical resistance is 1 MΩ. As a result, a potential difference between the race ring and the rolling element is 1 V. Accordingly, water of the grease is electrolyzed and hydrogen is generated.

In the comparison 1, the surface of the pulley has no coating. A static electricity (charged voltage) was −3.8 kV. 10 of 10 samples suffered from the inner ring foliation. The L10 lifetime was 295 hours, ⅕ of the calculation lifetime. In the comparison 2, a static electricity (charged voltage) was 0.9 kV, low. An electrical resistance of the path ranging from the outer surface of the pulley to the bearing outer ring was 10 Ω. A potential difference between the race ring and the rolling element is 2 V. 10 of 10 samples suffered from the inner ring foliation. The L10 lifetime was 1035 hours, shorter than the calculation lifetime. In the comparison 3, a thickness of the insulative coating film of the pulley is thick, 50 μm. Accordingly, creeping occurs between the inner surface of the pulley and the outer ring of the bearing. 10 of 10 samples suffered from the outer ring creeping. The L10 lifetime was short, 57 hours.

In the comparisons 4 and 5, the pulley surfaces were hard-chrome and zinc plated. The static electricity (charged voltage) of them were −2.3 kV and −5.5 kV, high. The resistance values each between the pulley outer surface and the bearing outer ring were 7 Ω and 9 Ω, small. The potential differences each between the race ring and the rolling element are both 3 V. 10 of 10 samples suffered from the inner ring foliation. The L10 lifetime were 315 hours and 115 hours, shorter than the calculation one.

In the embodiment, press-fitting is used for the coupling of the pulley and the bearing. When the press-fitting is used, the insulative coating film on the inner surface of the pulley to which the outer ring of the bearing is fit is likely to be worn or exfoliated. To avoid this, it is preferable that the pulley is heated and thermally expanded, and then the bearing is assembled into the pulley. The resultant rolling bearing unit is long in lifetime.

In the embodiment, the V-grooved pulley is used. And, it is confirmed that the rolling bearing unit using such a pulley has a long lifetime. The same effect is produced also when a pulley having a belt power transmission surface, such as a flat pulley (non-grooved pulley).

Figure 2:
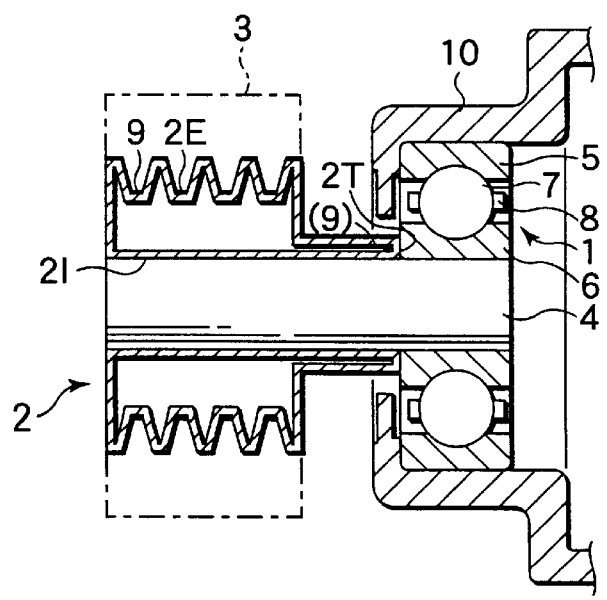
FIG. 2 is a longitudinal sectional view showing rolling bearing unit according to an another embodiment of the present invention.

In FIG. 2, the outer ring 5 of the rolling bearing 1 is fixed with a housing 10. A rotary shaft 4 is inserted into the inner ring 6 of the rolling bearing 1 and a through hole of the iron pulley 2, which is defined by an inner surface 2I thereof, whereby the inner ring 6 of the rolling bearing 1 rotates. In the structure, the iron pulley 2 and the rolling bearing 1 are arrayed side by side in the axial direction, while being in contact with each other. In this case, in order to increase an electrical resistance of the path ranging from the outer surface 2E of the iron pulley 2, viz., the belt sliding contact surface thereof, to the outer ring 5 of the bearing, an end face 2T of the iron pulley 2 (as viewed in the axial direction), which is in contact with the rolling bearing 1, is also subjected to electrodeposition coating, to have an insulative coating film 9 formed thereon.

As seen from the foregoing description, in the rolling bearing unit of the present invention, an insulative resin coating film of the range of 10 to 40 μm thick is formed on the outer surface and/or the inner surface of the pulley, which is used in combination with the rolling bearing. With formation of the insulative resin coating film, an electrical resistance of the path ranging from the belt sliding contact surface of the pulley to the outer surface or the inner surface of the rolling bearing is set at 1 MΩ or larger. Accordingly, a static electricity on the belt sliding contact surface of the pulley is 1 kV or lower. A potential difference between the race ring and the rolling element is 1 V or lower. As a result, there is less or no chance of generating hydrogen through the electrolysis of water contained in the grease. The rolling bearing is not exfoliated in an early stage, so that its lifetime is elongated.

What is claimed is:

1. A rolling bearing unit comprising:

a metallic pulley for slidably supporting a belt on an outer surface thereof; and a rolling bearing for rotatably supporting said pulley, wherein an insulative resin coating film with a thickness of the range of 10 to 40 μm is formed on at least one of the outer surface and an inner surface of said pulley.

2. The rolling bearing unit according to claim 1, wherein the insulative resin coating film is formed by a cation electrodeposition coating with an insulative resin.

3. The rolling bearing unit according to claim 2, wherein the insulative resin coating film is subjected to a surface of said pulley at which is in contact with said rolling bearing.

4. The rolling bearing unit according to claim 1, wherein an electrical resistance value of a path ranging from the outer surface of said pulley to said rolling bearing is 1 MΩ or larger.

5. The rolling bearing unit according to claim 4, wherein the insulative resin coating film is subjected to a surface of said pulley at which is in contact with said rolling bearing.

6. The rolling bearing unit according to claim 1, wherein a potential difference between a rolling element and one of an inner ring and an outer ring of said rolling bearing is 1 V or lower.

7. The rolling bearing unit according to claim 6, wherein the insulative resin coating film is subjected to a surface of said pulley at which is in contact with said rolling bearing.

8. The rolling bearing unit according to claim 1, wherein a static electricity on a belt sliding contact surface of said pulley which is in sliding contact with the belt is 1 kV or lower.

9. The rolling bearing unit according to claim 8, wherein the insulative resin coating film is subjected to a surface of said pulley at which is in contact with said rolling bearing.

10. The rolling bearing unit according to claim 1, wherein said rolling bearing unit is employed for an engine auxiliary equipment of a motor vehicle.

11. The rolling bearing unit according to claim 10, wherein the insulative resin coating film is subjected to a surface of said pulley at which is in contact with said rolling bearing.

12. The rolling bearing unit according to claim 1, wherein the insulating resin coating film is formed of at least one of amino-alkyd resin, epoxy resin, acrylic resin and vinyl chloride resin.

13. The rolling bearing unit according to claim 1, wherein the thickness of the insulative resin coating film is a range of 15 to 40 μm.

14. The rolling bearing unit according to claim 1, wherein the insulative resin coating film is subjected to a surface of said pulley at which is in contact with said rolling bearing.

* * * * *